(12) United States Patent
Lavenu

(10) Patent No.: US 9,979,031 B2
(45) Date of Patent: May 22, 2018

(54) STRUCTURE AND METHOD OF PRODUCTION FOR A BIPOLAR PLATE OF A FUEL CELL

(71) Applicant: SAFRAN POWER UNITS, Toulouse (FR)

(72) Inventor: Yoann Lavenu, Follainville (FR)

(73) Assignee: SAFRAN POWER UNITS, Toulouse (FR)

( * ) Notice: Subject to any disclaimer, the term of this patent is extended or adjusted under 35 U.S.C. 154(b) by 0 days. days.

(21) Appl. No.: 15/318,289

(22) PCT Filed: Jun. 9, 2015

(86) PCT No.: PCT/FR2015/051520
§ 371 (c)(1),
(2) Date: Dec. 12, 2016

(87) PCT Pub. No.: WO2015/189514
PCT Pub. Date: Dec. 17, 2015

(65) Prior Publication Data
US 2017/0125825 A1    May 4, 2017

(30) Foreign Application Priority Data
Jun. 13, 2014 (FR) ..................... 14 55378

(51) Int. Cl.
*H01M 8/0267* (2016.01)
*H01M 8/0206* (2016.01)
*H01M 8/0254* (2016.01)

(52) U.S. Cl.
CPC ....... *H01M 8/0267* (2013.01); *H01M 8/0206* (2013.01); *H01M 8/0254* (2013.01)

(58) Field of Classification Search
CPC . H01M 8/0267; H01M 8/0254; H01M 8/0206
See application file for complete search history.

(56) References Cited

U.S. PATENT DOCUMENTS

| 2003/0079870 A1* | 5/2003 | Watton | B01J 19/0013 165/166 |
| 2006/0134502 A1* | 6/2006 | Garceau | H01M 8/0206 429/434 |
| 2006/0134507 A1* | 6/2006 | Park | H01M 4/8828 429/482 |

FOREIGN PATENT DOCUMENTS

| DE | 20 2010 010972 U1 | 12/2010 |
| EP | 1 826 851 A1 | 8/2007 |
| FR | 2 996 361 A1 | 4/2014 |

OTHER PUBLICATIONS

International Search Report in corresponding International Application No. PCT/FR2015/051520 dated Aug. 31, 2015 (9 pages—English Translation included).

* cited by examiner

*Primary Examiner* — Ula C Ruddock
*Assistant Examiner* — Matthew W Van Oudenaren
(74) *Attorney, Agent, or Firm* — Bookoff McAndrews, PLLC

(57) ABSTRACT

A kit for forming a bipolar plate of a fuel cell, the kit comprising two half-plates (1A, 1B) adapted to be assembled one against the other, each of the two half-plates (1A, 1B) having grooves (11A, 12A, 11B, 12B) formed by embossing and extending in a longitudinal direction (X-X), and being adapted to form reagent flow channels (5A, 5B) on either side of the half-plates (1A, 1B), together with heat transfer fluid flow ducts (6) between the two half-plates (1A, 1B), the kit being characterized in that the half-plates (1A, 1B) are identical, each having at least one pair of complementary indexing elements (2A1, 2A2, 2B1, 2B2, 3A1, 3A2, 3B1, 3B2) made by embossing and adapted to center said half-plates (1A, 1B) relative to each other when they are assembled together.

13 Claims, 5 Drawing Sheets

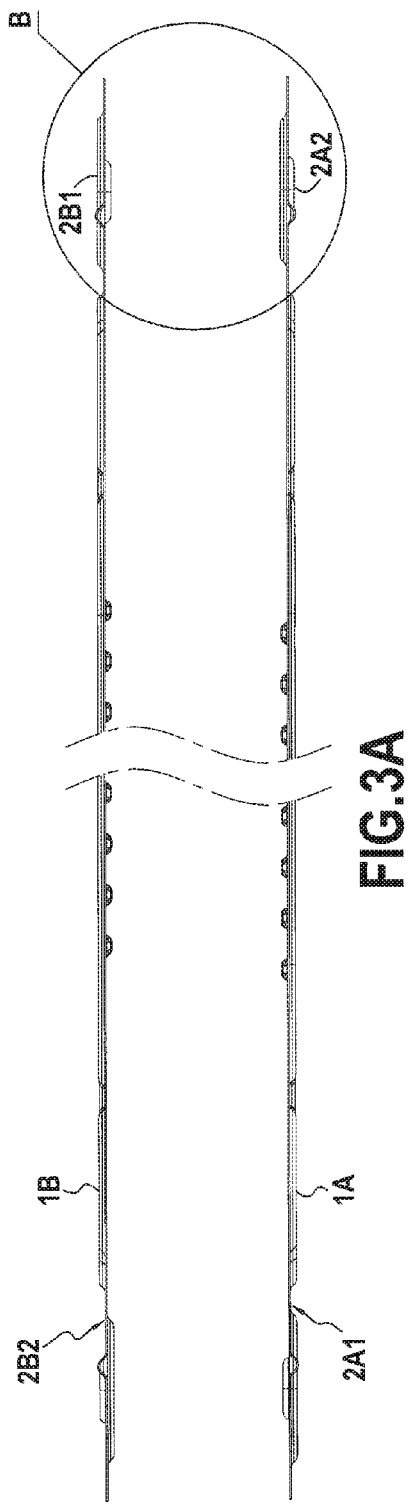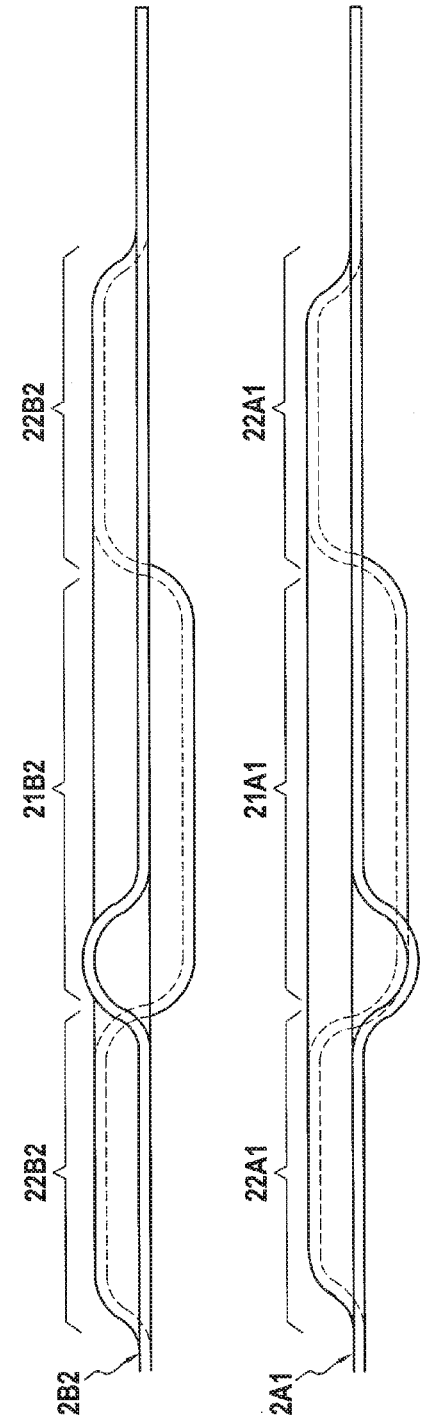

STRUCTURE AND METHOD OF PRODUCTION FOR A BIPOLAR PLATE OF A FUEL CELL

CROSS-REFERENCE TO RELATED APPLICATIONS

This application is the U.S. national phase entry under 35 U.S.C. § 371 of International Application No. PCT/FR2015/051520, filed on Jun. 9, 2015, which claims priority to French Patent Application No. 1455378, filed on Jun. 13, 2014, the entireties of which are incorporated herein by reference.

GENERAL TECHNICAL FIELD

The present invention relates to the field of fuel cells, and more particularly to assembling bipolar plates for fuel cells.

STATE OF THE ART

Optimizing the weight of fuel cells has led to improving the structure of bipolar plates by making them from two identical embossed half-plates that serve to perform several functions; pass a flow of reagent on the outside faces, pass a flow of a heat transfer fluid between the plates, electrically interconnect two electrode membrane assemblies, and press together and clamp the electrode membrane assembly.

Embossing the half-plates thus forms the cooling ducts for passing the heat transfer fluid that is used for cooling the fuel cell.

These cooling ducts lie on either side of ducts for passing flows of reagents, and they are of dimensions that are very small being of the order of a few tenths of a millimeter, which is very constraining in terms of tolerances in fabrication and assembly.

Present-day techniques for assembling half-plates consist in using a centering peg remotely positioned on tooling, or a system of brackets remotely positioned on tooling.

Nevertheless, those solutions are problematic for obtaining the desired tolerances; positioning by using tooling involves two successive clearances, one between a first half-plate and the tooling, and another between the tooling and a second half-plate, thereby increasing the total dispersion of the assembly.

The present invention thus seeks to remedy this problem at least in part.

SUMMARY OF THE INVENTION

To this end, the present invention provides a kit for forming a bipolar plate of a fuel cell, the kit comprising two half-plates adapted to be assembled one against the other, each of the two half-plates having grooves formed by embossing and extending in a longitudinal direction, and being adapted to form reagent flow channels on either side of the half-plates, together with heat transfer fluid flow ducts between the two half-plates, the kit being characterized in that the half-plates are identical, each having at least one pair of complementary indexing elements made by embossing and adapted to center said half-plates relative to each other when they are assembled together.

The indexing elements of each of the half-plates are typically made by embossing during the same embossing pass as is used for forming the grooves.

In a particular embodiment, the grooves of each half-plate define the thickness of the half-plate, and wherein the indexing elements of each half-plate lie typically within the thickness of each half-plate.

In a particular embodiment, each of the pairs of indexing elements of the half-plates comprises two complementary indexing elements arranged symmetrically relative to a middle axis of the half-plate under consideration.

By way of example, each of the half-plates comprises two pairs of indexing elements:
 a pair of circular indexing elements formed on either side of a middle longitudinal axis of each half-plate; and
 a pair of oblong indexing elements formed on either side of the middle longitudinal axis of each half-plate.

The two half-plates are advantageously made from a single batch of embossing by hydroforming.

The invention also provides a bipolar fuel cell plate formed from a kit according to any of the above-described embodiments, the two half-plates of said kit being assembled together after turning one of said half-plates through 180° about a middle axis of the half-plate.

The invention also provides a method of forming half-plates suitable for being assembled one against the other so as to form a bipolar fuel cell plate, wherein two identical half-plates are formed by embossing so that each of them presents grooves extending in a longitudinal direction and adapted to form reagent flow channels on either side of the half-plates, together with heat transfer fluid flow ducts between the two half-plates, and also at least one pair of complementary indexing elements adapted to center said half-plates relative to each other while they are being assembled together.

The grooves and the indexing elements of each of the half-plates are typically made during the same embossing pass.

In a particular implementation, the embossing for forming the grooves defines a thickness for each half-plate, and wherein the indexing elements of each half-plate are typically contained within the thickness of each half-plate.

In a particular implementation, for each of the half-plates, a pair of circular indexing elements are formed by embossing on either side of a middle longitudinal axis of each half-plate, and a pair of oblong indexing elements are formed by embossing on either side of the longitudinal middle axis of each half-plate.

Advantageously, both half-plates are made in a single batch of embossing by hydroforming.

The present invention also provides a method of assembling a bipolar fuel cell plate, the method comprising the following steps:
 obtaining a kit according to any of the above-described embodiments;
 turning one of the half-plates through 180° about the middle axis of the half-plate in question; and
 superposing the two half-plates one on the other so that their complementary pairs of indexing elements engage, thereby centering said two half-plates relative to each other.

SUMMARY OF THE FIGURES

Other characteristics, objects, and advantages of the invention appear from the following description, which is purely illustrative and non-limiting, and which should be read with reference to the accompanying figures, in which.

FIGS. 3, 4, and 5 show how a kit in an aspect of the invention is assembled to form a bipolar plate of a fuel cell, FIGS. 3A and 4A being elevation views of two half-plates before and after assembly, FIGS. 3B and 4B being views showing details B in FIGS. 3A and 4A, and FIG. 5 being a perspective view of two half-plates prior to assembly.

Throughout the figures, elements that are common are identified by numerical references that are identical.

DETAILED DESCRIPTION

Figure 1:
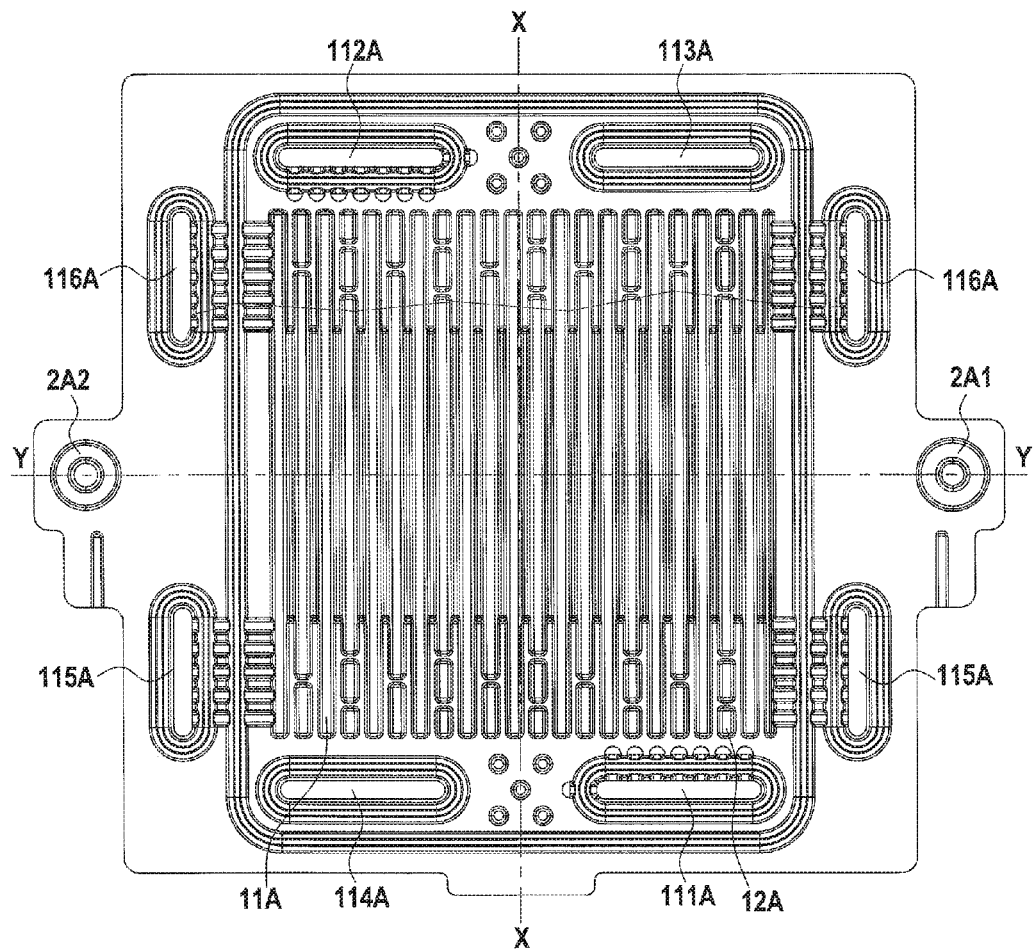
FIG. 1 is a view of a half-plate of a kit in an aspect of the invention.

FIG. 1 is a view of a half-plate of a kit in an aspect of the invention.

This figure shows a first half-plate 1A adapted to be assembled with an identical second half-plate 1B (not shown in this figure) in order to form a bipolar plate of a fuel cell.

The description below relates to the half-plate 1A, and since the half-plate 1B is identical, its elements are identified by the same numerical references as those of the half-plate 1A, but terminating in the letter B.

The first half-plate 1A is made from a blank obtained from a metal sheet that is embossed to have relief that is crenellated in cross-section (in the transverse direction parallel to the axis Y-Y), as shown in FIG. 1, each crenellation defining a channel.

By way of example, each crenellation may be trapezoidal in shape with one of its faces open so as to form a U-shape with its branches flaring towards the opening. Two types of crenellation are identified that are arranged in alternation: long crenellations 11A and short crenellations 12A; where the terms "long" and "short" are arbitrary and represent the fact that these crenellations are of different widths, where width is measured along the axis Y-Y.

The two half-plates 1A and 1B are identical and are mounted back to back after turning one of the half-plates through 180° about its middle longitudinal axis X-X so as to engage long crenellations 11A or 11B in either of the half-plates 1A and 1B in short crenellations 12A or 12B in the other half-plate 1B or 1A.

Figure 2:
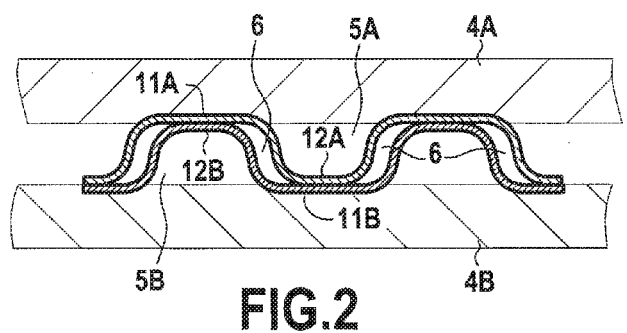
FIG. 2 is a fragmentary section view of a kit in an aspect of the invention.

FIG. 2 is a section view of this engagement between crenellations of the superposed half-plates 1A and 1B, which half-plates are arranged between two diffusion layers 4A and 4B of a fuel cell. The first half-plate 1A adjoins a first diffusion layer 4A, and the second half-plate 1B adjoins a second diffusion layer 4B.

As can be seen in the figure, engaging short crenellations 12A and 12B in long crenellations 11A and 11B serves to form flow channels for reagents between the short crenellations and the diffusion layers, and also cooling channels between the two half-plates 1A and 1B.

Respective first channels 5A are thus defined between the first plate 4A and the first diffusion layer 4A, and second reagent channels 5B are defined between the second plate 1B and the second diffusion layer 4B.

The difference in width between the long crenellations 11A and 11B and the short crenellations 12A and 12B also serves to form cooling ducts 6 between the two half-plates 1A and 1B.

Consequently, the crenellations are generally of trapezoidal shape with an open base, and since the half-plates are identical, the bases of the crenellations bear against one another. The cooling ducts 6 are thus formed between the branches of the long crenellations 11A, 11B and the short crenellations 12A, 12B.

The cooling ducts 6 and the reagent channels 5A and 5B are connected to openings for feeding and discharging fluid, which openings are provided at the periphery of each half-plate 1A and 1B.

With reference to the half-plate 1A, FIG. 1 thus shows:
- a feed opening 111A for the first reagent;
- a discharge opening 112A for the first reagent;
- a feed opening 113A for the second reagent;
- a discharge opening 114A for the second reagent;
- two feed openings 115A for the cooling fluid, which are connected to the cooling ducts 6; and
- two discharge openings 116A for the cooling fluid, which are connected to the cooling ducts 6.

The half-plates 1A and 1B thus serve to provide ducts and channels for passing flows of reagents and of a cooling fluid for a fuel cell.

In order to ensure that the half-plates 1A and 1B are accurately positioned relative to each other, and consequently in order to ensure that the cooling ducts 6 are properly formed, indexing elements are made in each of the half-plates 1A and 1B, typically by embossing, and advantageously during the same embossing pass as provides the various crenellations in each of the half-plates 1A and 1B.

In the embodiment shown in FIG. 1, the half-plate 1A has a pair of indexing elements arranged substantially at the two ends of the half-plate 1A along a middle transverse axis Y-Y and on either side of a middle longitudinal axis X-X.

Thus, first and second indexing elements 2A1 and 2A2 are defined for the first half-plate 1A.

The half-plate 1B is identical, and thus has first and second indexing elements 2B1 and 2B2.

These indexing elements are configured in such a manner that the first indexing element 2A1 can engage in the second indexing element 2A2, and thus in the second indexing element 2B2 of the half-plate 1B, since it is identical.

In order to achieve such engagement, one of the half-plates is turned through 180° about its middle longitudinal axis X-X, and is then superposed on the other half-plate.

These indexing elements are formed by embossing so as to form a central boss extending on one side of the half-plate 1A and surrounded by a peripheral boss extending on the other side of the half-plate 1A.

By way of example, the indexing elements are arranged symmetrically relative to a middle axis of the half-plate under consideration, in this example relative to the axis X-X.

Figure 4A:
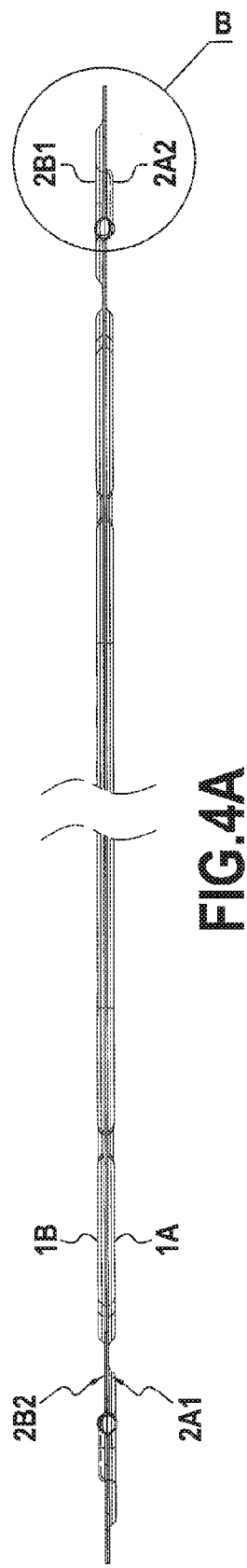
Figure 4B:
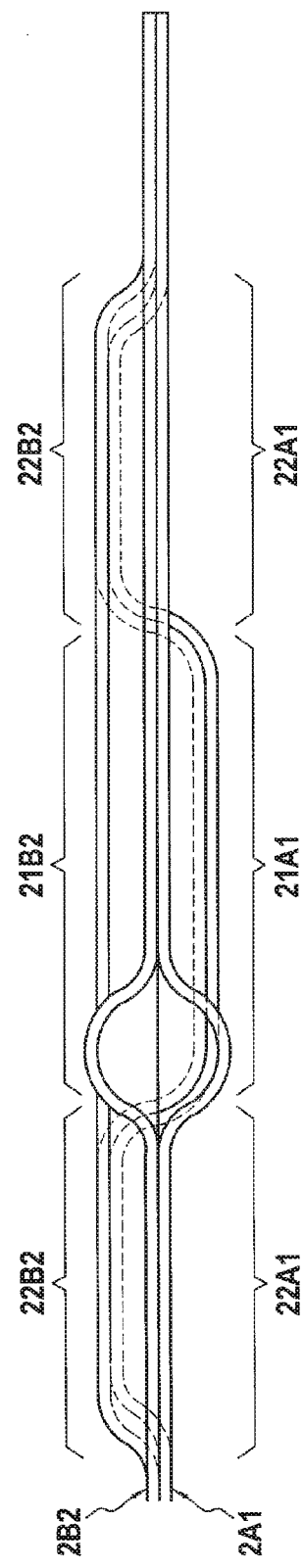
Figure 5:
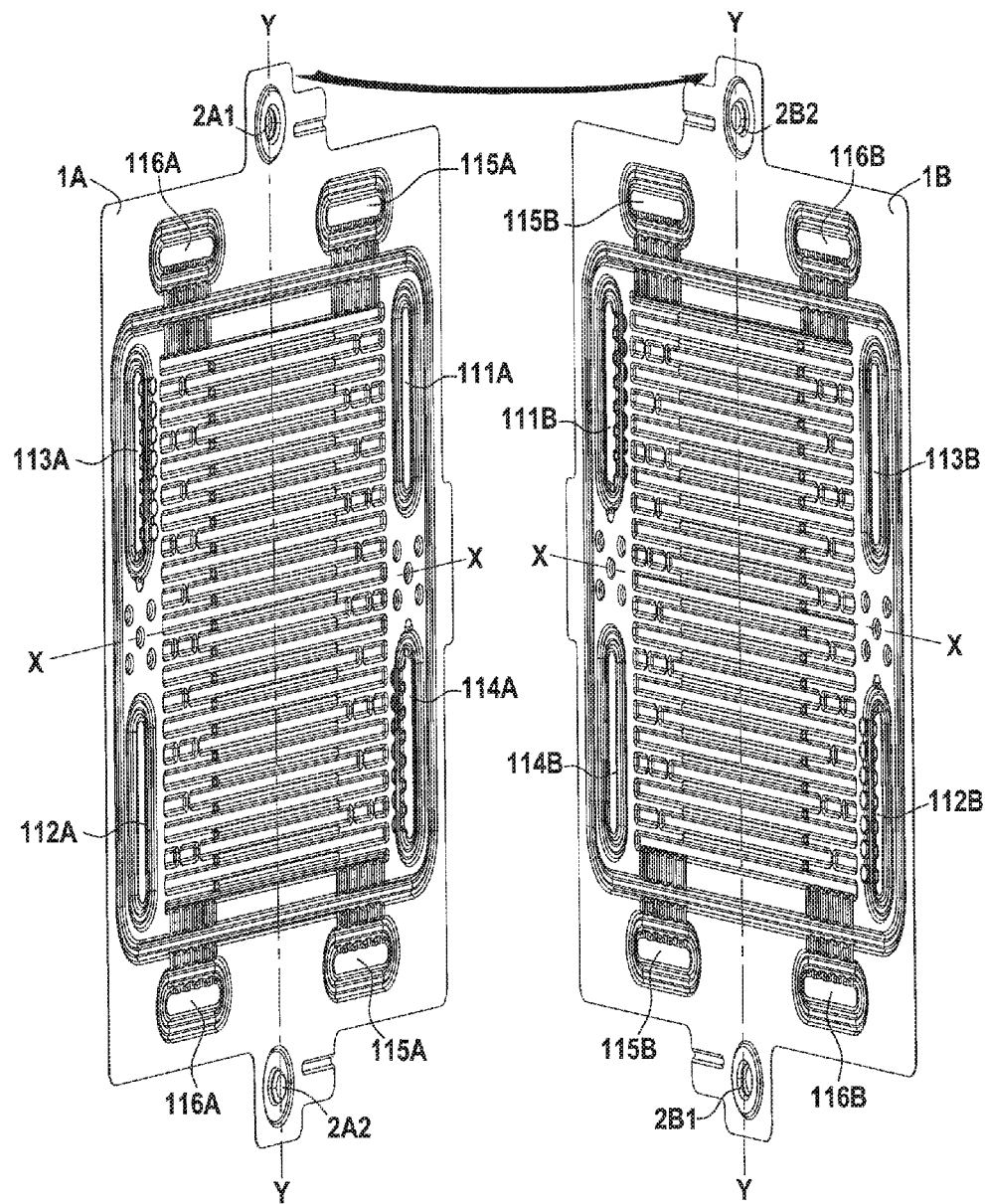

FIGS. 3 to 5 show how the two half-plates 1A and 1B are engaged in order to form a bipolar plate.

As can be seen in the figures, with reference to the half-plate 1A, a central boss 21A1 extends on one side of the half-plate 1A, while a peripheral boss 22A1 extends on the other side of the half-plate 1A, together forming the indexing element 2A.

An indexing element 2B2 is formed on the plate 1B. This indexing element 2B2 also has a central boss 21B2 that extends on one side of the half-plate 1B, while a peripheral boss 22B2 extends on the other side of the half-plate 1B, together forming the indexing element 2B2.

The indexing elements 2A1 and 2B2 are complementary, i.e. they engage mutually when the half-plates 1A and 1B are assembled together. More precisely, and as shown in the figures, after the half-plate 1A has been turned through 180° about its axis X-X and has then been superposed on the half-plate 1B, the central boss 21B2 co-operates with the central boss 21A1, and the peripheral boss 22A1 co-operates with the peripheral boss 22B2.

In the embodiment shown in FIG. 1, the indexing elements 2A1 and 2B2 are circular; this serves to index the two half-plates 1A and 1B in the direction X-X and in the direction Y-Y.

The indexing elements 2A1 and 2A2 may be arranged symmetrically relative to a middle axis of the half-plate 1A, and in this example relative to the axis X-X.

Figure 6:
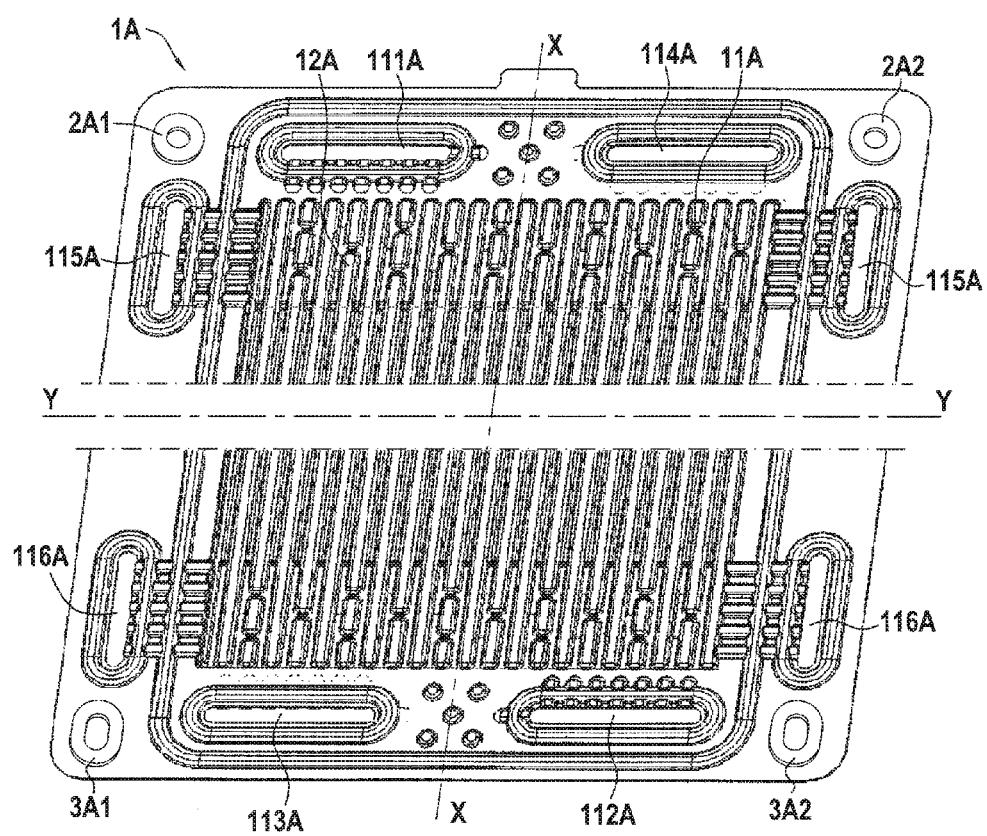
FIG. 6 is a perspective view of a half-plate of a kit in another aspect of the invention.

In the embodiment shown in FIG. 6, another pair of indexing elements 3A1 and 3A2 is arranged on the half-plate 1A. The indexing elements 3A1 and 3A2 may be arranged symmetrically relative to a middle axis of the half-plate 1A, in this example relative to the axis X-X.

In addition, in the embodiment shown, the indexing elements 2A1 and 2A2 are arranged on either side of the axis Y-Y, the indexing elements 3A1 and 3A2 being arranged on either side of the axis Y-Y. The indexing elements 3A1 and 3A2 are of structure similar to the indexing elements 2A1 and 2A2, thus comprising a central boss extending on one side of the half-plate 1A and a peripheral boss extending on the other side of the half-plate 1A.

In the embodiments shown, unlike the indexing elements 2A1 and 2A2 that are circular, the indexing elements 3A1 and 3A2 are oblong. They thus enable centering to be taken up along the direction Y-Y.

Such an embodiment associating circular indexing elements and oblong indexing elements is particularly advantageous for half-plates of considerable length, with centering being performed by the circular indexing elements 2A1, 2A2, 2B1, and 2B2, while the function of taking up centering as performed by the oblong indexing elements 3A1, 3A2, 3B1, and 3B2 serves to compensate for differences that might occur as a result of length that is too long.

Each of the half-plates 1A and 1B thus has at least one pair of indexing elements adapted to center the two half-plates 1A and 1B relative to each other in the direction defined by the axes X-X and Y-Y.

The number of indexing elements may vary as a function of the dimensions of the half-plates.

For example, for half-plates of small dimensions, it can suffice to make a single pair of indexing elements on each of the half-plates, e.g. on either side of the axis X-X, typically at the ends of the half-plates along the axis Y-Y.

Each of the half-plates may then have only one pair of indexing elements that are circular and complementary.

When the half-plates are of larger dimensions, each of the half-plates may have one pair of circular indexing elements made therein together with a pair of oblong indexing elements in order to take up centering.

Furthermore, the two half-plates 1A and 1B used for forming a bipolar plate of a fuel cell are advantageously formed in the same process, i.e. from a single batch and using the same parameters for shaping and the same tooling, thereby serving to eliminate dispersion in terms of spacing between the various indexing elements of the half-plates.

The half-plates 1A and 1B are thus centered by pairs of indexing elements belonging to the half-plates 1A and 1B, and advantageously formed while shaping the various crenellations that serve to form the channels and the ducts of the bipolar plate.

Such centering avoids the dispersion that might arise from using distinct centering tools for the half-plates, and thus makes it possible to obtain better accuracy.

The shaping method used is typically embossing, e.g. by hydroforming.

The crenellations made in each of the half-plates 1A and 1B typically define the thickness of each of the half-plates 1A and 1B. The indexing elements of each of the half-plates 1A and 1B are typically advantageously made so as to lie within the thickness of the corresponding half-plate, thereby serving to limit the overall size of the assembly.

The half-plate structure described above, and also the associated fabrication method, thus enable improved centering to be obtained for the half-plates when making a bipolar plate of a fuel cell.

The invention claimed is:

1. A kit for forming a bipolar plate of a fuel cell, the kit comprising two half-plates adapted to be assembled one against the other, each of the two half-plates having grooves formed by embossing and extending in a longitudinal direction, and being adapted to form reagent flow channels on either side of the half-plates, together with heat transfer fluid flow ducts between the two half-plates, wherein the half-plates are identical, each having at least one pair of complementary indexing elements formed by embossing and adapted to center said half-plates relative to each other when they are assembled together, and wherein the at least one pair of complementary indexing elements are configured to mechanically interlock with one another.

2. A kit according to claim 1, wherein the indexing elements of each of the half-plates are made by embossing during the same embossing pass as is used for forming the grooves.

3. A kit according to claim 1, wherein the grooves of each half-plate define the thickness of the half-plate, and wherein the indexing elements of each half-plate lie within the thickness of each half-plate.

4. A kit according to claim 1, wherein each of the pairs of indexing elements of the half-plates comprises two complementary indexing elements arranged symmetrically relative to a middle axis of the half-plate under consideration.

5. A kit according to claim 1, wherein each of the half-plates comprises two pairs of indexing elements including:
   a pair of circular indexing elements formed on either side of a middle longitudinal axis of each half-plate; and
   a pair of oblong indexing elements formed on either side of the middle longitudinal axis of each half-plate.

6. A kit according to claim 1, wherein the two half-plates are made from a single batch of embossing by hydroforming.

7. A bipolar fuel cell plate formed from a kit according to claim 1, the two half-plates of said kit being assembled together after turning one of said half-plates through 180° about a middle axis of the half-plate.

8. A method of forming half-plates suitable for being assembled one against the other so as to form a bipolar fuel cell plate, wherein two identical half-plates are formed by embossing so that each of them presents grooves extending in a longitudinal direction and adapted to form reagent flow channels on either side of the half-plates, together with heat transfer fluid flow ducts between the two half-plates, and also at least one pair of complementary indexing elements adapted to center said half-plates relative to each other while they are being assembled together; and wherein the at least one pair of complementary indexing elements are configured to mechanically interlock with one another.

9. A method according to claim 8, wherein the grooves and the indexing elements of each of the half-plates are made during the same embossing pass.

10. A method according to claim 8, wherein the embossing for forming the grooves defines a thickness for each half-plate, and wherein the indexing elements of each half-plate are contained within the thickness of each half-plate.

11. A method according to claim 8, wherein, for each of the half-plates, a pair of circular indexing elements are formed by embossing on either side of a middle longitudinal axis of each half-plate, and a pair of oblong indexing elements are formed by embossing on either side of the longitudinal middle axis of each half-plate.

12. A method according to claim 8, wherein both half-plates are made in a single batch of embossing by hydroforming.

13. A method of assembling a bipolar fuel cell plate, the method comprising the following steps:
   obtaining a kit as defined in claim 1;
   turning one of the half-plates through 180° about the middle axis of the half-plate in question; and
   superposing the two half-plates one on the other so that their complementary pairs of indexing elements engage, thereby centering said two half-plates relative to each other.

* * * * *